(12) United States Patent
Itoh et al.

(10) Patent No.: US 10,682,730 B2
(45) Date of Patent: Jun. 16, 2020

(54) ALUMINUM ALLOY BRAZING SHEET

(71) Applicant: UACJ Corporation, Tokyo (JP)

(72) Inventors: Yasunaga Itoh, Tokyo (JP); Tomoki Yamayoshi, Tokyo (JP); Yutaka Yanagawa, Tokyo (JP)

(73) Assignee: UACJ CORPORATION, Tokyo (JP)

( * ) Notice: Subject to any disclaimer, the term of this patent is extended or adjusted under 35 U.S.C. 154(b) by 236 days.

(21) Appl. No.: 15/744,205

(22) PCT Filed: Jun. 29, 2016

(86) PCT No.: PCT/JP2016/069255
§ 371 (c)(1),
(2) Date: Jan. 12, 2018

(87) PCT Pub. No.: WO2017/010287
PCT Pub. Date: Jan. 19, 2017

(65) Prior Publication Data
US 2018/0200842 A1   Jul. 19, 2018

Related U.S. Application Data

(60) Provisional application No. PCT/JP2016/069255, filed on Jun. 29, 2016.

(30) Foreign Application Priority Data

Jul. 13, 2015 (JP) .................. 2015-139748

(51) Int. Cl.
*B23K 35/28* (2006.01)
*B23K 35/22* (2006.01)
(Continued)

(52) U.S. Cl.
CPC ........ *B23K 35/288* (2013.01); *B23K 35/0238* (2013.01); *B23K 35/22* (2013.01);
(Continued)

(58) Field of Classification Search
None
See application file for complete search history.

(56) References Cited

U.S. PATENT DOCUMENTS

| | | | |
|---|---|---|---|
| 8,343,635 B2 * | 1/2013 | Matsumoto | .......... B23K 1/0012 |
| | | | 428/654 |
| 2003/0099856 A1 | 5/2003 | Takeno et al. | |
| 2015/0037607 A1 | 2/2015 | Itoh et al. | |

FOREIGN PATENT DOCUMENTS

| | | |
|---|---|---|
| EP | 2 103 702 A1 | 9/2009 |
| JP | 55-104452 A | 8/1980 |

(Continued)

OTHER PUBLICATIONS

Office Action dated May 15, 2019, issued in counterpart JP application No. 2015-139748, with English translation. (11 pages).

(Continued)

*Primary Examiner* — Daniel J. Schleis
(74) *Attorney, Agent, or Firm* — Westerman, Hattori, Daniels & Adrian

(57) ABSTRACT

An aluminum alloy brazing sheet used for brazing aluminum, without using a flux, in an inert gas atmosphere or vacuum is formed by arranging a brazing material on one side or both sides of a core material made of pure aluminum or aluminum alloy, the brazing material including 6% to 13% by mass of Si and the balance being Al and inevitable impurities, and performing cladding with an intermediate material interposed between the core material and the brazing material, the intermediate material including 0.01% to 1.5% by mass of Bi, 1.5% to 13% by mass of Si, and the balance being Al and inevitable impurities, the intermediate material having a thickness of 2% to 35% of a thickness of the brazing material, wherein one or both of the intermediate material and the core material includes 0.4% to 6% by mass of Mg.

12 Claims, 1 Drawing Sheet

(51) Int. Cl.
*C22C 21/00* (2006.01)
*F28F 21/08* (2006.01)
*B23K 35/02* (2006.01)
*B32B 15/01* (2006.01)
*C22C 21/02* (2006.01)
 B23K 101/14 (2006.01)
 F28F 3/02 (2006.01)
 F28F 1/02 (2006.01)

(52) U.S. Cl.
CPC ............ *B23K 35/28* (2013.01); *B32B 15/016* (2013.01); *C22C 21/00* (2013.01); *C22C 21/02* (2013.01); *F28F 21/089* (2013.01); *B23K 2101/14* (2018.08); *F28F 1/02* (2013.01); *F28F 3/025* (2013.01); *F28F 21/084* (2013.01); *Y10T 428/12764* (2015.01)

(56) References Cited

FOREIGN PATENT DOCUMENTS

| | | | |
|---|---|---|---|
| JP | S55104452 | * | 8/1980 |
| JP | 2004-358519 A | | 12/2004 |
| JP | 2012-148344 A | | 8/2012 |
| JP | 2012-236201 A | | 12/2012 |
| JP | 2012236201 | * | 12/2012 |
| JP | 2013-1941 A | | 1/2013 |
| JP | 2014-50861 A | | 3/2014 |
| JP | 2014-155955 A | | 8/2014 |
| JP | 2015-30861 A | | 2/2015 |
| JP | 2015-33716 A | | 2/2015 |

OTHER PUBLICATIONS

International Search Report dated Aug. 16, 2016, issued in counterpart International Application No. PCT/JP2016/069255 (2 pages).
Office Action dated Feb. 26, 2019, issued in counterpart CN Application No. 201680040774.4, with English translation. (15 pages).
Extended Search Report dated Jan. 25, 2019, issued in counterpart EP Application No. 16824267.5 (9 pages).

* cited by examiner

ALUMINUM ALLOY BRAZING SHEET

TECHNICAL FIELD

The present invention relates to an aluminum alloy brazing sheet used for brazing aluminum, without using a flux, in an inert gas atmosphere or a vacuum.

BACKGROUND ART

Brazing is widely used as a method for jointing aluminum products including a number of fine jointing portions, such as aluminum heat exchangers and mechanical components. Brazing aluminum requires breaking an oxide film covering the surface, and bring the molten brazing material into contact with base metal or brazing material molten in the same manner. Methods for breaking an oxide film are broadly classified into a method of using a flux and a method of heating the oxide film in vacuum, and both of them are put to practical use.

An application range of brazing is wide, and the most typical example is a heat exchanger for vehicles. Most of heat exchangers for vehicles, such as radiators, heaters, condensers, and evaporators, are made of aluminum, and most of them are manufactured by brazing. Among brazing methods, a method of applying a noncorrosive flux and heating it in a nitrogen gas atmosphere occupies the majority part of the methods at present.

In recent years, due to change in the driving system in electric cars and hybrid cars, heat exchangers equipped with electronic components, such as an inverter cooler, appear, and residue of a flux is regarded as problem in increasing cases. For this reason, some of inverter coolers are manufactured by vacuum brazing in which no flux is used. However, vacuum brazing requires high equipment cost and high maintenance cost for the heating furnace, and has problem in productivity and brazing stability. Such a situation increases needs for jointing without using a flux in a nitrogen gas furnace.

To respond to the needs, various methods have been presented as a method of enabling brazing, without using a flux, in an inert gas atmosphere, by diffusing Mg into a brazing material during brazing heating. Examples of the methods include a method of diffusing Mg added to the core material into the brazing material, and a method of diffusing Mg added to the sacrificial anode material disposed between the core material and the brazing material into the brazing material. These methods prevent formation of an oxide film on the surface of the brazing material in manufacturing of a clad material or during brazing heating, and Mg effectively acts on destruction of the oxide film on the surface of the brazing film.

However, destruction of the oxide film on the surface of the brazing material is not sufficiently performed, by merely diffusing Mg into the brazing material. Without application of a flux, sufficient fillet formation ability cannot be exhibited in a practical joint having a clearance. By contrast, another method has been presented. In the method, Bi is added to the brazing material, to promote the action of Mg of breaking the oxide film, and greatly improve the brazing properly without applying a flux. However, when Bi exceeding 0.05% is added to the brazing material, a Bi-based oxide is generated on the surface of the brazing material at the stage of manufacturing of the material. Brazing the material with the Bi-based oxide without any treatment causes discoloration, and the problem of marked deterioration in brazing properties.

The mechanism of generation of a Bi-based oxide can be explained from the fact that Bi has a low melting point (approximately 270° C.) and is hardly dissolved in aluminum. Specifically, in hot rolling and/or annealing, Bi scattered in a state of a substantially pure substance is molten, to adsorb oxygen and form a thick Bi-based oxide film, and deteriorates the brazing properties. Reducing the Bi quantity in the brazing material can be one way to suppress it, but causes failure in full achievement of the effect of Bi. Although a certain effect is obtained by performing pretreatment before brazing to remove the Bi-based oxide, reoxidation occurs during preheating for brazing in an inert gas atmosphere with oxygen concentration of 20 ppm or higher, and the effect of the pretreatment is lost. By contrast, excellent brazing properties are exhibited in a low-oxygen atmosphere. However, achieving a low-oxygen atmosphere requires much cost, and is not practical.

PRIOR ART DOCUMENT

Patent Literatures

[Patent Literature 1] Japanese Patent Publication 2004-358519-A

[Patent Literature 2] Japanese Patent Publication 2013-001941-A

[Patent Literature 3] Japanese Patent Publication 2014-050861-A

SUMMARY OF INVENTION

Problem to be Solved by Invention

The present invention has been made to solve the above problem in the case of brazing aluminum without using a flux in an inert gas atmosphere, such as a nitrogen gas atmosphere, or in vacuum. An object of the present invention is to provide an aluminum alloy brazing sheet enabling excellent brazing properties by promptly supplying Bi and Mg into the brazing material during brazing heating, causing these elements to be eluted in the molten brazing material after start of melting the brazing material, and effectively embrittling the oxide film on the surface of the brazing material.

Means for Solving the Problem

An aluminum alloy brazing sheet according to claim 1 to achieve the object described above is a brazing sheet used for brazing aluminum, without using a flux, in an inert gas atmosphere or vacuum, and formed by arranging a brazing material on one side or both sides of a core material made of pure aluminum or aluminum alloy, the brazing material including 6% to 13% of Si and the balance being Al and inevitable impurities, and performing cladding with an intermediate material interposed between the core material and the brazing material, the intermediate material including 0.01% to 1.5% of Bi, 1.5% to 13% of Si, and the balance being Al and inevitable impurities, the intermediate material having a thickness of 2% to 35% of a thickness of the brazing material, wherein one or both of the intermediate material and the core material includes 0.4% to 6% of Mg. In the following explanation, all the alloy components are expressed with % by mass.

An aluminum alloy brazing sheet according to claim 2 is a brazing sheet used for brazing aluminum, without using a flux, in an inert gas atmosphere or vacuum, and formed by arranging a brazing material on one side or both sides of a core material made of pure aluminum or aluminum alloy, the brazing material including 6% to 13% of Si and the balance being Al and inevitable impurities, and performing cladding with an intermediate material and a sacrificial anode material interposed between the core material and the brazing material such that the materials are arranged in an order of the core material, the sacrificial anode material, the intermediate material, and the brazing material, the intermediate material including 0.01% to 1.5% of Bi, 1.5% to 13% of Si, and the balance being Al and inevitable impurities, the sacrificial anode material including 0.9% to 6% of Zn and the balance being Al and inevitable impurities, the intermediate material having a thickness of 2% to 35% of a thickness of the brazing material, wherein at least one of the intermediate material, the sacrificial anode material, and the core material includes 0.4% to 6% of Mg.

An aluminum alloy brazing sheet according to claim 3 is a brazing sheet used for brazing aluminum, without using a flux, in an inert gas atmosphere or vacuum, and formed by arranging a brazing material on one side of a core material made of pure aluminum or aluminum alloy, the brazing material including 6% to 13% of Si and the balance being Al and inevitable impurities, arranging a sacrificial anode material on the other side of the core material, the sacrificial anode material including 0.9% to 6% of Zn and the balance being Al and inevitable impurities, and performing cladding with an intermediate material interposed between the core material and the brazing material, the intermediate material including 0.01% to 1.5% of Bi, 1.5% to 13% of Si, and the balance being Al and inevitable impurities, the intermediate material having a thickness of 2% to 35% of a thickness of the brazing material, wherein one or both of the intermediate material and the core material includes 0.4% to 6% of Mg.

An aluminum alloy brazing sheet according to claim 4 is the brazing sheet according to any one of claims 1 to 3, wherein the core material of the aluminum alloy includes at least one of 1.8% or less of Mn, 1.2% or less of Si, 1.0% or less of Fe, 1.5% or less of Cu, 0.8% or less of Zn, 0.2% or less of Ti, and 0.5% or less of Zr, and the balance being Al and inevitable impurities.

An aluminum alloy brazing sheet according to claim 5 is the brazing sheet according to any one of claims 1 to 4, wherein the intermediate material further includes at least one of 6% or less of Cu and 6% or less of Zn.

Effects of the Invention

The present invention provides an aluminum alloy brazing sheet enabling excellent brazing properties by promptly supplying Bi and Mg into the brazing material during brazing heating, causing these elements to be eluted in the molten brazing material after start of melting the brazing material, and effectively embrittling the oxide film on the surface of the brazing material.

EMBODIMENT OF INVENTION

Figure 1:
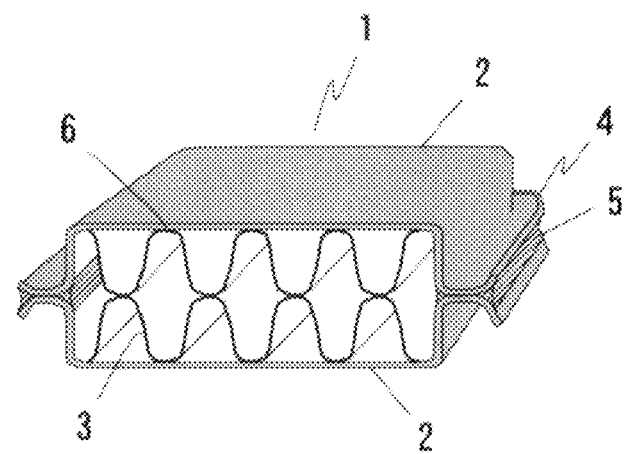
FIG. 1 is an outside drawing of a cup test piece to evaluate a fillet formation state in an example of the present invention.

A first embodiment of an aluminum alloy brazing sheet according to the present invention is a brazing sheet used for brazing aluminum, without using a flux, in an inert gas atmosphere or vacuum, and formed by arranging a brazing material on one side or both sides of a core material made of pure aluminum or aluminum alloy, the brazing material including 6% to 13% of Si and the balance being Al and inevitable impurities, and performing cladding with an intermediate material interposed between the core material and the brazing material, the intermediate material including 0.01% to 1.5% of Bi, 1.5% to 13% of Si, and the balance being Al and inevitable impurities, the intermediate material having a thickness of 2% to 35% of a thickness of the brazing material, wherein one or both of the intermediate material and the core material includes 0.4% to 6% of Mg.

A second embodiment is a brazing sheet used for brazing aluminum, without using a flux, in an inert gas atmosphere or vacuum, and formed by arranging a brazing material on one side or both sides of a core material made of pure aluminum or aluminum alloy, the brazing material including 6% to 13% of Si and the balance being Al and inevitable impurities, and performing cladding with an intermediate material and a sacrificial anode material interposed between the core material and the brazing material such that the materials are arranged in an order of the core material, the sacrificial anode material, the intermediate material, and the brazing material, the intermediate material including 0.01% to 1.5% of Bi, 1.5% to 13% of Si, and the balance being Al and inevitable impurities, the sacrificial anode material including 0.9% to 6% of Zn and the balance being Al and inevitable impurities, the intermediate material having a thickness of 2% to 35% of a thickness of the brazing material, wherein at least one of the intermediate material, the sacrificial anode material, and the core material includes 0.4% to 6% of Mg.

A third embodiment is a brazing sheet used for brazing aluminum, without using a flux, in an inert gas atmosphere or vacuum, and formed by arranging a brazing material on one side of a core material made of pure aluminum or aluminum alloy, the brazing material including 6% to 13% of Si and the balance being Al and inevitable impurities, arranging a sacrificial anode material on the other side of the core material, the sacrificial anode material including 0.9% to 6% of Zn and the balance being Al and inevitable impurities, and performing cladding with an intermediate material interposed between the core material and the brazing material, the intermediate material including 0.01% to 1.5% of Bi, 1.5% to 13% of Si, and the balance being Al and inevitable impurities, the intermediate material having a thickness of 2% to 35% of a thickness of the brazing material, wherein one or both of the intermediate material and the core material includes 0.4% to 6% of Mg.

The core material is preferably pure aluminum, or aluminum alloy including at least one of 1.8% or less of Mn, 1.2% or less of Si, 1.0% or less of Fe, 1.5% or less of Cu, 0.8% or less of Zn, 0.2% or less of Ti, and 0.5% or less of Zr, and the balance being Al and inevitable impurities. The core material preferably includes 0.4% to 6% of Mg.

In the core material of aluminum alloy, Mn effectively functions to improve the strength and regulate the potential. A preferable content of Mn is 1.8% or less, and a content exceeding 1.8% causes easy occurrence of crack in rolling of the material. A more preferable content range is 0.3% to 1.8%. A content less than 0.3% has difficulty in obtaining a sufficient effect of improving the strength.

Si effectively functions to improve the strength. A preferable content of Si is 1.2% or less. A content exceeding 1.2% decreases the melting point, causes local melting in brazing, and may cause deformation of the core material to decrease the corrosion resistance. A more preferable lower limit value of the Si content to enhance the strength is 0.3%.

Fe effectively functions to improve the strength. A preferable content of Fe is 1.0% or less. A content exceeding 1.0% decreases the corrosion resistance, and causes easy occurrence of huge deposits. A more preferable lower limit value of the Fe content to enhance the strength is 0.2%.

Cu effectively functions to enhance the strength and regulate the potential. A preferable content of Cu is 1.5% or less. A content exceeding 1.5% is not preferable, because it causes easy occurrence of intergranular corrosion, and decreases the melting point. A more preferable lower limit value of the Cu content to enhance the strength is 0.2%.

Zn effectively functions to regulate the potential. A preferable content of Zn is 0.8% or less. A content exceeding 0.8% decreases the natural electrode potential, and shortens through-life due to corrosion. A more preferable lower limit value of the Zn content to regulate the potential is 0.1%.

Ti effectively functions to advance corrosion in a layered manner. A preferable content of Ti is 0.2% or less. A content exceeding 0.2% causes easy occurrence of huge deposits, and impedes rolling properties and corrosion resistance. A more preferable lower limit value of the Ti content to advance layered corrosion is 0.06%. Zr effectively functions to increase the crystal grain size. A preferable content of Zr is 0.5% or less. A content of Zr exceeding 0.5% causes easy occurrence of crack in manufacturing of the material. A more preferable lower limit value of the Zr content to increase the crystal grain size is 0.2%.

The brazing material is an ordinary Al—Si brazing material, and the Si quantity thereof is set to 6% to 13%. A Si content less than 6% fails to achieve sufficient jointing properties. A Si content exceeding 13% causes easy occurrence of crack in manufacturing of the material, and causes difficulty in manufacturing of the brazing sheet.

In the first to the third embodiments, Bi included in the intermediate material interposed between the core material and the brazing material promotes destruction of an oxide film with Mg supplied from the intermediate material and/or the core material to the brazing material in brazing heating, to improve the brazing properties. The intermediate material functions to supply these elements to the brazing material. A preferable content of Bi included in the intermediate material is 0.01% to 1.5%. A Bi content less than 0.01% causes deficiency of Bi eluted to the brazing material, and causes difficulty in achieving the function to break an oxide film on the surface of the brazing material. A Bi content exceeding 1.5% causes easy occurrence of crack in rolling of the material, and causes difficulty in manufacturing of the brazing sheet. A more preferable content of Bi is 0.1% to 1.5%.

As described above, Bi included in the intermediate material promotes the function to break the oxide film, with Mg supplied from the intermediate material and/or the core material to the brazing material in brazing heating, to effectively improve the brazing properties. When Bi exceeding 0.05% is directly added to the brazing material, a thick Bi-based oxide is formed at the stage of manufacturing the material and/or during brazing heating. The thick Bi-based oxide is accompanied by discoloration, and markedly deteriorates brazing properties. For this reason, addition of Bi requires pretreatment before brazing, and a low-oxygen atmosphere. By contrast, according to the present invention with a structure of supplying Bi to the brazing material through the intermediate material, Bi is hardly solid-diffused in aluminum. For this reason, until the intermediate material is dissolved with the molten brazing material or the intermediate material itself is molten, Bi is not supplied into the brazing material and no Bi-based oxide is formed. In this way, Bi can be supplied with a quantity that is not effective when it is directly added to the brazing material, and effectively promotes the function of destroying an oxide film with Mg in the surface of the brazing material. Accordingly, excellent brazing properties can be achieved, without pretreatment before brazing or low-oxygen concentration atmosphere. Bi of 0.05% or less may be added to the brazing material, as well as addition of Bi to the intermediate material.

Si included in the intermediate material promotes dissolution of the intermediate material with the molten brazing material during brazing heating, and causes the intermediate material itself to be molten, to cause active and efficient supply of Mg and Bi to the molten brazing material. The intermediate material itself can also function as brazing material.

A preferable Si content in the intermediate material is 1.5% to 13%. If the Si content is less than 1.5%, the effect of promoting dissolution of the intermediate material cannot be expected with the molten brazing material at the brazing temperature, and the intermediate material is hardly melted. For this reason, Bi and Mg existing on the surface of the intermediate material facing the core material remain even after brazing heating, and supply of Mg and Bi becomes inefficient. A Si content exceeding 13% causes easy occurrence of crack in rolling of the material, and causes difficulty in manufacturing of the brazing sheet.

The thickness of the intermediate material is 2% to 35% of a thickness of the brazing material adjacent to the intermediate material. A thickness less than 2% requires increase in the Bi concentration and the Mg concentration in the intermediate material, and causes difficulty in manufacturing of the material. A thickness exceeding 35% decreases the thickness of the brazing material, and Mg included in the intermediate material reaches the surface before the brazing material is molten during brazing heating, and makes the film on the surface firm. Reduction in the Mg concentration in the intermediate material suppresses arrival of the Mg at the surface, but causes deficiency in the absolute quantity of Mg, and insufficiency of the function to break the oxide film. When no Mg is added to the intermediate material but Mg of the core material is used, the thickness of the brazing material is reduced. For this reason, Bi in the intermediate material reaches the surface of the brazing material earlier than Mg, to form a Bi-based oxide and deteriorate the brazing properties.

Because Mg included in the intermediate material or the core material has low oxide formation free energy, they are diffused into the brazing material in brazing heating, to form a unique oxide in the aluminum oxide film covering the surface of the brazing material, and induce destruction of the aluminum oxide film by formation of the unique oxide. When Mg is directly added to the brazing material, because formation of a unique oxide proceeds also at the stage of manufacturing the brazing sheet, not only the added Mg is consumed wastefully, but also the surface oxide film becomes firmer. In this case, performing etching before brazing becomes necessary to peel off the oxide film.

By contrast, in the case of supplying Mg to the brazing material through the intermediate material or the core material, formation of a unique oxide does not progress at the stage of manufacturing the brazing sheet, but the substances are diffused into the brazing material from the intermediate material or the core material at the stage of brazing heating. For this reason, a uniquely formed oxide serves as a starting point to divide the oxide film after melting of the brazing material, and the oxide film is embrittled. In addition, with start of melting of the brazing material, because dissolution of the intermediate material into the molten brazing material also progresses, Mg is eluted into the molten brazing material promptly. Because diffusion of elements in the molten brazing material progresses very quickly in comparison with diffusion in a solid, formation of a unique oxide rapidly progresses in the surface of the brazing material, and destruction of the oxide film is promoted.

In particular, in the method of supplying Mg to the brazing material through the intermediate material, diffusion of the elements into the brazing material progresses with higher concentration than that in a method of simply adding Mg to the core material and the sacrificial anode material directly under the brazing material and diffusing the elements into the brazing material. In addition, because dissolution of the intermediate material into the molten brazing material accompanying with start of melting of the brazing material is more than dissolution of the core material and the sacrificial anode material into the molten brazing material, and the supply quantity of Mg to the brazing material becomes larger, and formation of the unique oxide is intensively performed. With intensive progress of formation of the unique oxide immediately before brazing, destruction of the aluminum oxide film is induced efficiently and strongly. In this case, the brazing properties are improved, and stable brazing properties can be achieved without performing etching before brazing.

Mg included in the intermediate material or the core material, or both of them, breaks the oxide film and improves the brazing properties, as described above. A preferable Mg content is 0.4% to 6.0%. A Mg content less than 0.4% causes deficiency of the Mg quantity diffused and eluted into the brazing material, and causes difficulty in achieving the function to break the oxide film on the surface of the brazing material. A Mg content exceeding 6.0% causes easy occurrence of crack in manufacturing of the material, and difficulty in manufacturing of the brazing sheet. When Mg is included in the core material, a more preferable upper limit value is 1.3%. A Mg content exceeding 1.3% decreases the melting point of the core material, and causes local melting in the core material in brazing heating. This may cause deformation of the core material, and occurrence of erosion to the core material with the molten brazing material, and deteriorate the brazing properties and corrosion resistance.

It is effective to further add Cu and Zn to the intermediate material, to reduce the solidus temperature of the intermediate material. In the case where the solidus temperature of the intermediate material is higher than the solidus temperature of the brazing material, at the point when the brazing material starts melting, the intermediate material has not yet been molten or has just started melting, and supply of Mg and Bi included in the intermediate material to the brazing material is late. However, in the case where Cu and Zn are added to the intermediate material to reduce the solidus temperature of the intermediate material, the intermediate material can be partly or wholly molten before the brazing material is molten. In this case, Bi and Mg can be immediately supplied into the brazing material when the brazing material starts melting, and early destruction of the oxide film and ultra-high speed heating can be employed.

As preferable contents of Cu and Zn functioning effectively to decrease the solidus temperature of the intermediate material, the Cu content is 6% or less and the Zn content is 6% or less. A content of each of them exceeding the upper limit causes easy occurrence of crack in rolling of the material, and causes difficulty in manufacturing of the brazing sheet. As more preferable lower limit values of the Cu content and the Zn content to decrease the melting point, the Cu content is 1.0% and the Zn content is 1.0%.

The sacrificial anode material used in the second embodiment and the third embodiment provides an anti-corrosion effect to the sacrificial anode material side. A preferable content of Zn in the sacrificial anode material is 0.9% to 6%. A Zn content less than 0.9% fails to achieve a sufficient anti-corrosion effect. A Zn content exceeding 6% promotes corrosion, and deteriorates the corrosion-through-life.

In the second embodiment, the sacrificial anode material may include Mg, to break the oxide film and improve the brazing properties. A preferable Mg content is 0.4% to 6%. A Mg content less than 0.4% causes deficiency of the Mg quantity diffused and eluted into the brazing material, and causes difficulty in achievement of a function to break the oxide film on the surface of the brazing material. A Mg content exceeding 6.0% causes easy occurrence of crack in manufacturing of the material, and difficulty in manufacturing of the brazing sheet. A more preferable upper limit value of the Mg content is 1.3%. A Mg content exceeding 1.3% reduces the melting point of the sacrificial anode material, and causes local melting in the sacrificial anode material in brazing heating and deformation of the sacrificial anode material. This causes erosion with the molten brazing material to the sacrificial anode material, and may deteriorate the brazing properties and the corrosion resistance.

The brazing sheet according to the present invention is manufactured by preparing ingots of the core material, the brazing material, the intermediate material, and the sacrificial anode material with the compositions described above, rolling some of them to a predetermined thickness, and performing clad rolling using them by a conventional method. The intermediate material may be an ingot cut in a plate shape, or a rolled sheet (hot rolled sheet, cool rolled sheet) obtained by rolling the ingot.

The present invention also has the following advantage. Specifically, because an ordinary material that can be produced regardless of the location (material that can be produced or supplied in various places in the world) can be applied as the brazing material and the core material of the brazing sheet of the present invention, the brazing sheet of the present invention can be produced in any place in the world, regardless of the location, as long as the factory is capable of manufacturing an ordinary aluminum clad material. The intermediate material being a special material may be acquired by obtaining a plain coil rolled within or outside the country or an ingot slab, and using a cut material thereof. Because the rate of the intermediate material occupying the brazing sheet is low, that is, substantially 5% or less, the intermediate material has small influence on the cost caused by transport costs and customs duties, even when a plain coil and/or an ingot slab thereof is imported to be used.

The degree of freedom of the site is effectively exhibited also in the site for producing the products, such as heat exchangers, as well as production of the material. Specifically, in production of heat exchangers, acid and/or alkaline are used for etching before brazing, but much load is required for the solution management and waste liquid treatment. For this reason, many processing manufacturers for heat exchangers and the like often avoid execution of etching, and etching in abroad processing manufacturers is difficult. The present invention can also solve such a problem.

EXAMPLES

The following is explanation of examples of the present invention in comparison with a comparative example, to prove the effects of the present invention. These examples illustrate an embodiment of the present invention, and the present invention is not limited thereto.

Example 1

The brazing material, the core material, the intermediate material, and the sacrificial anode material having the compositions listed in Table 1 were individually casted into ingots by continuous casting. For the core material, the obtained ingot was machined to a size of 163 mm in length, 163 mm in width, and 27 mm in thickness. For the brazing material, the obtained ingot was subjected to hot rolling to a thickness of 2.23 mm to 2.93 mm, and cut to a size of 163 mm in length and 163 mm in width.

For the intermediate material, the obtained ingot was subjected to hot rolling to a thickness of 3 mm, thereafter subjected to cold rolling to a thickness of 0.07 mm to 0.77 mm, and cut to a size of 163 mm in length and 163 mm in width. For some of the intermediate material, a cut product of the ingot was prepared. For the sacrificial anode material, the obtained ingot was subjected to hot rolling to a thickness of 3 mm, thereafter subjected to cold rolling to a thickness of 1.5 mm, and cut to a size of 163 mm in length and 163 mm in width.

The brazing material, the core material, the intermediate material, and the sacrificial anode material prepared were subjected to clad rolling by a conventional method, to obtain an annealed clad sheet material with a thickness of 0.4 mm. The sheet material was used as a test material.

After the test material was pressed in a cup shape, two test materials are prepared. One material was prepared by subjecting the material to only degreasing (without etching) with acetone, and the other material was prepared by subjecting the material to degreasing with acetone and thereafter to etching with weak acid (with etching). Each of the test materials was incorporated into a cup test piece illustrated in FIG. 1. A fin obtained by molding and degreasing a 3003 alloy sheet material with a thickness of 0.1 mm was disposed inside the cup test piece, and brazed without a flux.

The brazing was performed in a nitrogen gas furnace, or in a vacuum furnace. The nitrogen gas furnace was a two-chambered experimental furnace, and the oxygen concentration thereof in brazing was 15 ppm to 20 ppm. The vacuum furnace was a batch-type one-chambered experimental furnace, and the in-furnace pressure thereof in brazing was $5 \times 10^{-3}$ Pa to $8 \times 10^{-3}$ Pa. The temperature which each of the test pieces reached was set to 600° C.

In FIG. 1, 1 denotes a cup test piece, 2 denotes a test material, 3 denotes a fin, 4 denotes a flare groove joint, and 5 denotes a fillet formed outside the flare groove joint. The following evaluation was performed on a fillet 5 (expressed as "outside" in the cup brazing test in Table 1) formed on the outside of the flare groove joint, and a fillet 6 (expressed as "inside" in the cup brazing test in Table 1) formed in a joint portion between the test piece and the fin. Table 1 lists the evaluation results.

Figure 2:
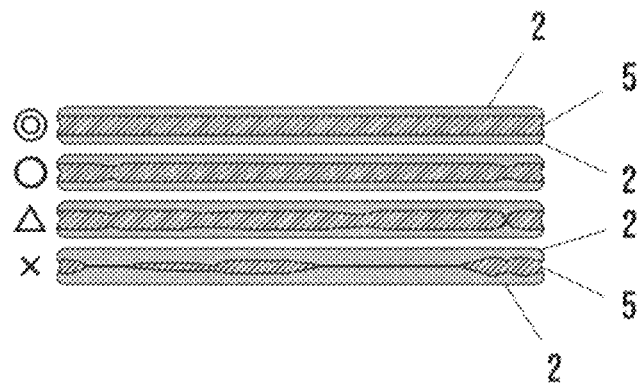
FIG. 2 is a diagram illustrating fillet formation states with evaluation of ⊚ to X for a fillet formed on the external side of a flare groove joint of the cup test piece.

As illustrated in FIG. 2, for the "outside", the fillet 5 formed on the outside of the flare groove joint 4 was evaluated by observation with four levels. The four levels are: "⊚: a continuous fillet is formed with a uniform size", "○: a state in which 50% or more of the fillet has a uniform size although the fillet size fluctuates, or a state in which the fillet is small although the fillet has a uniform shape", "△: a state in which the fillet is partly disconnected and discontinuous, or a state in which 50% or more of the fillet has a non-uniform size", and "X: fillet is hardly formed or the material is not brazed". Among the levels, ⊚ and ○ were determined as passing levels. For the "inside", the brazed test piece was divided into two, and the fillet formation state was evaluated by observation with four levels in the same manner as above, for the inside of the flare groove joint and the jointing portion of the fin.

TABLE 1

| No. | Region | Chemical Composition (mass %) | | | | | | | | | | Thickness (mm) | Clad Ratio (%) | Intermediate Material/brazing Material (%) | Atmosphere | Cup Brazing Test | |
| | | Si | Fe | Cu | Mn | Mg | Cr | Zn | Ti | Zr | Bi | | | | | Not Etched | Etched |
| 1 | Brazing Material | 6 | — | — | — | — | — | — | — | — | — | 0.4 | 9.1 | 10 | Nitrogen | Outside: ○ Inside: ○ | Outside: ○ Inside: ○ |
| | Intermediate Material | 6 | — | — | 5 | — | — | — | — | — | 1 | | 0.9 | | | | |
| | Core Material | — | — | — | — | — | — | — | — | — | — | | — | | | | |
| 2 | Brazing Material | 13 | — | — | — | — | — | — | — | — | — | 0.4 | 8.7 | 15 | Nitrogen | Outside: ○ Inside: ○ | Outside: ○ Inside: ⊚ |
| | Intermediate Material | 1.5 | — | — | — | 3 | — | — | — | — | 0.8 | | 1.3 | | | | |
| | Core Material | — | — | — | 1.2 | — | — | — | — | — | — | | — | | | | |
| 3 | Brazing Material | 10 | — | — | — | — | — | — | — | — | — | 0.4 | 7.7 | 30 | Nitrogen | Outside: ○ Inside: ○ | Outside: ○ Inside: ○ |
| | Intermediate Material | 10 | — | — | — | 3 | — | — | — | — | 0.01 | | 2.3 | | | | |
| | Core Material | — | — | — | 1.2 | — | — | — | — | — | — | | — | | | | |
| 4 | Brazing Material | 10 | — | — | — | — | — | — | — | — | — | 0.4 | 9.5 | 5 | Nitrogen | Outside: ○ Inside: ○ | Outside: ○ Inside: ⊚ |
| | Intermediate Material | 10 | — | — | — | 5 | — | — | — | — | 1.5 | | 0.5 | | | | |

TABLE 1-continued

| No. | Region | Chemical Composition (mass %) | | | | | | | | | | Thickness (mm) | Clad Ratio (%) | Intermediate Material/brazing Material (%) | Atmosphere | Cup Brazing Test | |
|---|---|---|---|---|---|---|---|---|---|---|---|---|---|---|---|---|---|
| | | Si | Fe | Cu | Mn | Mg | Cr | Zn | Ti | Zr | Bi | | | | | Not Etched | Etched |
| 5 | Core Material | — | — | — | 1.2 | — | — | — | — | — | — | 0.4 | — | 15 | Nitrogen | Outside: ○ Inside: ○ | Outside: ◎ Inside: ◎ |
| | Brazing Material | 10 | — | — | — | — | — | — | — | — | — | | 8.7 | | | | |
| | Intermediate Material | 13 | — | — | — | 3 | — | — | — | — | 0.8 | | 1.3 | | | | |
| 6 | Core Material | — | — | — | 1.2 | — | — | — | — | — | — | 0.4 | — | 2 | Nitrogen | Outside: ○ Inside: ○ | Outside: ○ Inside: ○ |
| | Brazing Material | 10 | — | — | — | — | — | — | — | — | — | | 9.8 | | | | |
| | Intermediate Material | 10 | — | — | — | 5 | — | — | — | — | 0.8 | | 0.2 | | | | |
| 7 | Core Material | — | — | — | 1.2 | 0.6 | — | — | — | — | — | 0.4 | — | 35 | Nitrogen | Outside: ○ Inside: ○ | Outside: ◎ Inside: ◎ |
| | Brazing Material | 10 | — | — | — | — | — | — | — | — | — | | 7.4 | | | | |
| | Intermediate Material | 7.5 | — | — | — | 3 | — | — | — | — | 0.1 | | 2.6 | | | | |
| 8 | Core Material | — | — | — | 1.2 | 0.6 | — | — | — | — | — | 0.4 | — | 25 | Nitrogen | Outside: ○ Inside: ○ | Outside: ○ Inside: ○ |
| | Brazing Material | 10 | — | — | — | — | — | — | — | — | — | | 8.0 | | | | |
| | Intermediate Material | 13 | — | — | — | 0.4 | — | — | — | — | 0.4 | | 2.0 | | | | |
| 9 | Core Material | — | — | — | 1.2 | 0.6 | — | — | — | — | — | 0.4 | — | 15 | Nitrogen | Outside: ○ Inside: ○ | Outside: ◎ Inside: ◎ |
| | Brazing Material | 10 | — | — | — | — | — | — | — | — | — | | 8.7 | | | | |
| | Intermediate Material | 10 | — | — | — | 6 | — | — | — | — | 0.8 | | 1.3 | | | | |
| 10 | Core Material | — | — | — | 1.2 | — | — | — | — | — | — | 0.4 | — | 10 | Nitrogen | Outside: ○ Inside: ○ | Outside: ○ Inside: ○ |
| | Brazing Material | 10 | — | — | — | — | — | — | — | — | — | | 9.1 | | | | |
| | Intermediate Material | 6 | — | — | — | — | — | — | — | — | 0.8 | | 0.9 | | | | |
| 11 | Core Material | — | — | — | 1.2 | 0.4 | — | — | — | — | — | 0.4 | — | 25 | Nitrogen | Outside: ○ Inside: ○ | Outside: ○ Inside: ○ |
| | Brazing Material | 10 | — | — | — | — | — | — | — | — | — | | 8.0 | | | | |
| | Intermediate Material | 10 | — | — | — | — | — | — | — | — | 0.8 | | 2.0 | | | | |
| 12 | Core Material | — | — | — | 1.2 | 1.3 | — | — | — | — | — | 0.4 | — | 25 | Vacuum | Outside: ○ Inside: ◎ | Outside: ◎ Inside: ◎ |
| | Brazing Material | 10 | — | — | — | — | — | — | — | 0.4 | — | | 8.0 | | | | |
| | Intermediate Material | 10 | — | — | — | 6 | — | — | — | — | — | | 2.0 | | | | |
| 13 | Core Material | — | — | — | 1.2 | — | — | — | — | — | — | 0.4 | — | 25 | Nitrogen | Outside: ○ Inside: ◎ | Outside: ○ Inside: ◎ |
| | Brazing Material | 12 | — | — | — | — | — | — | — | — | — | | 7.6 | | | | |
| | Intermediate Material | 10 | — | — | — | 3 | — | — | — | — | 0.8 | | 1.9 | | | | |
| 14 | Core Material | — | — | — | 1.2 | — | — | — | — | — | — | 0.4 | — | 25 | Nitrogen | Outside: ○ Inside: ◎ | Outside: ○ Inside: ◎ |
| | Sacrificial anode material | — | — | — | — | — | — | 2.5 | — | — | — | | 4.8 | | | | |
| | Brazing material | 12 | — | — | — | — | — | — | — | — | — | | 7.6 | | | | |
| | Intermediate Material | 10 | — | — | — | — | — | — | — | — | 0.8 | | 1.9 | | | | |
| | Sacrificial anode material | — | — | — | 0.4 | — | — | 2.5 | — | — | — | | 4.8 | | | | |
| 15 | Core Material | — | — | — | 1.2 | — | — | — | — | — | — | 0.4 | — | 25 | Nitrogen | Outside: ○ Inside: ◎ | Outside: ◎ Inside: ◎ |
| | Brazing Material | 12 | — | — | — | — | — | — | — | — | — | | 7.6 | | | | |
| | Intermediate Material | 10 | — | — | — | — | — | — | — | — | 0.8 | | 1.9 | | | | |

TABLE 1-continued

| No. | Region | Si | Fe | Cu | Mn | Mg | Cr | Zn | Ti | Zr | Bi | Thickness (mm) | Clad Ratio (%) | Intermediate Material/brazing Material (%) | Atmosphere | Cup Brazing Test Not Etched | Cup Brazing Test Etched |
|---|---|---|---|---|---|---|---|---|---|---|---|---|---|---|---|---|---|
|  | Sacrificial anode material | — | — | — | — | 1.3 | — | 2.5 | — | — | — |  | 4.8 |  |  |  |  |
|  | Core Material | — | — | — | 1.2 | — | — | — | — | — | — |  | — |  |  |  |  |
| 16 | Brazing Material | 10 | — | — | — | — | — | — | — | — | — | 0.4 | 8.7 | 15 | Nitrogen | Outside: ○ Inside: ◉ | Outside: ◎ Inside: ◎ |
|  | Intermediate Material | 3 | — | 5 | — | 3 | — | 5 | — | — | 0.4 |  | 1.3 |  |  |  |  |
|  | Core Material | — | — | — | 1.2 | 0.6 | — | — | — | — | — |  | — |  |  |  |  |
| 17 | Brazing Material | 12 | — | — | — | — | — | — | — | — | — | 0.4 | 8.0 | 25 | Nitrogen | Outside: ◎ Inside: ◎ | Outside: ◎ Inside: ◎ |
|  | Intermediate Material | 7 | — | 4 | — | 0.4 | — | 4 | — | — | 0.2 |  | 2.0 |  |  |  |  |
|  | Core Material | — | — | — | 1.2 | 0.6 | — | — | — | — | — |  | — |  |  |  |  |

As listed in Table 1, each of the cup test pieces obtained by incorporating the test materials 1 to 17 according to the present invention proved to be capable of producing an excellent brazed state of a passing level, without etching. Although a cut ingot material (163 mm in length, 163 mm in width, and 3 mm in thickness) was applied as the intermediate material to the test material 15, the cup test piece obtained by incorporating the test material 15 also produced an excellent brazed state in the same manner.

Comparative Example 1

The brazing material, the core material, the intermediate material, and the sacrificial anode material having the compositions listed in Table 2 were casted into ingots by continuous casting, to manufacture an annealed clad sheet materials with a thickness of 0.4 mm in the same manner as Example 1. Cup test pieces were prepared with the sheet materials serving as the test materials, and subjected to brazing heating in a nitrogen gas furnace under the same conditions as those of Example 1, to evaluate the brazed states of the cup test pieces in the same manner as Example 1. Table 2 lists the evaluation results. In Table 2, the underlined values are values that fail to satisfy the conditions of the present invention. As a test material for comparison, a clad material in which no intermediate material is interposed was prepared in the same manner.

TABLE 2

| No. | Region | Si | Fe | Cu | Mn | Mg | Cr | Zn | Ti | Zr | Bi | Thickness (mm) | Clad Ratio (%) | Intermediate Material/brazing Material (%) | Atmosphere | Cup Brazing Test Not Etched | Cup Brazing Test Etched |
|---|---|---|---|---|---|---|---|---|---|---|---|---|---|---|---|---|---|
| 18 | Brazing Material | 10 | — | — | — | 0.5 | — | — | — | — | 0.03 | 0.4 | 10 | — | Nitrogen | Outside: Δ Inside: Δ | Outside: Δ Inside: ○ |
|  | Core Material | — | — | — | 1.2 | — | — | — | — | — | — |  | — |  |  |  |  |
| 19 | Brazing Material | 10 | — | — | — | — | — | — | — | — | 0.03 | 0.4 | 10 | — | Nitrogen | Outside: Δ Inside: Δ | Outside: Δ Inside: ◎ |
|  | Core Material | — | — | — | 1.2 | 0.6 | — | — | — | — | — |  | — |  |  |  |  |
| 20 | Brazing Material | 10 | — | — | — | — | — | — | — | — | 0.03 | 0.4 | 9.5 | — | Nitrogen | Outside: Δ Inside: Δ | Outside: Δ Inside: ◎ |
|  | Sacrificial Anode Material | — | — | — | — | 0.6 | — | 2.5 | — | — | — |  | 4.8 |  |  |  |  |
|  | Core Material | — | — | — | 1.2 | — | — | — | — | — | — |  | — |  |  |  |  |
| 21 | Brazing Material | 4 | — | — | — | — | — | — | — | — | — | 0.4 | 8.7 | 15 | Nitrogen | Outside: X Inside: Δ | Outside: Δ Inside: Δ |
|  | Intermediate Material | 10 | — | — | — | 3 | — | — | — | — | 0.8 |  | 1.3 |  |  |  |  |
|  | Core Material | — | — | — | 1.2 | — | — | — | — | — | — |  | — |  |  |  |  |
| 22 | Brazing Material | 16 | — | — | — | — | — | — | — | — | — | — | — | — | — | — | — |

TABLE 2-continued

| No. | Region | Chemical Composition (mass %) | | | | | | | | | | Thickness (mm) | Clad Ratio (%) | Intermediate Material/brazing Material (%) | Atmosphere | Cup Brazing Test | |
| --- | --- | --- | --- | --- | --- | --- | --- | --- | --- | --- | --- | --- | --- | --- | --- | --- | --- |
| | | Si | Fe | Cu | Mn | Mg | Cr | Zn | Ti | Zr | Bi | | | | | Not Etched | Etched |
| | Intermediate Material | 10 | — | — | — | 3 | — | — | — | — | 0.8 | | — | | | | |
| | Core Material | — | — | — | 1.2 | — | — | — | — | — | — | | — | | | | |
| 23 | Brazing Material | 10 | — | — | — | — | — | — | — | — | — | 0.4 | 7.4 | 35 | Nitrogen | Outside: Δ Inside: Δ | Outside: Δ Inside: ○ |
| | Intermediate Material | 10 | — | — | — | 3 | — | — | — | — | 0.005 | | 2.6 | | | | |
| | Core Material | — | — | — | 1.2 | — | — | — | — | — | — | | — | | | | |
| 24 | Brazing Material | 10 | — | — | — | — | — | — | — | — | — | — | — | — | — | — | — |
| | Intermediate Material | 10 | — | — | — | 3 | — | — | — | — | 1.8 | | — | | | | |
| | Core Material | — | — | — | 1.2 | — | — | — | — | — | — | | — | | | | |
| 25 | Brazing Material | 10 | — | — | — | — | — | — | — | — | — | 0.4 | 8.7 | 15 | Nitrogen | Outside: X Inside: Δ | Outside: Δ Inside: Δ |
| | Intermediate Material | 1 | — | — | — | 3 | — | — | — | — | 0.8 | | 1.3 | | | | |
| | Core Material | — | — | — | 1.2 | — | — | — | — | — | — | | — | | | | |
| 26 | Brazing Material | 10 | — | — | — | — | — | — | — | — | — | — | — | — | — | — | — |
| | Intermediate Material | 15 | — | — | — | 3 | — | — | — | — | 0.8 | | — | | | | |
| | Core Material | — | — | — | 1.2 | — | — | — | — | — | — | | — | | | | |
| 27 | Brazing Material | 10 | — | — | — | — | — | — | — | — | — | 0.4 | 9.9 | 1 | Nitrogen | Outside: Δ Inside: Δ | Outside: Δ Inside: ○ |
| | Intermediate Material | 10 | — | — | — | 6 | — | — | — | — | 1.5 | | 0.1 | | | | |
| | Core Material | — | — | — | 1.2 | 0.6 | — | — | — | — | — | | — | | | | |
| 28 | Brazing Material | 10 | — | — | — | — | — | — | — | — | — | 0.4 | 7.3 | 37 | Nitrogen | Outside: X Inside: X | Outside: Δ Inside: Δ |
| | Intermediate Material | 7.5 | — | — | — | 3 | — | — | — | — | 0.4 | | 2.7 | | | | |
| | Core Material | — | — | — | 1.2 | — | — | — | — | — | — | | — | | | | |
| 29 | Brazing Material | 10 | — | — | — | — | — | — | — | — | — | 0.4 | 7.3 | 37 | Nitrogen | Outside: X Inside: X | Outside: Δ Inside: Δ |
| | Intermediate Material | 7.5 | — | — | — | — | — | — | — | — | 0.4 | | 2.7 | | | | |
| | Core Material | — | — | — | 1.2 | 0.6 | — | — | — | — | — | | — | | | | |
| 30 | Brazing Material | 10 | — | — | — | — | — | — | — | — | — | 0.4 | 7.4 | 35 | Nitrogen | Outside: X Inside: Δ | Outside: Δ Inside: Δ |
| | Intermediate Material | 10 | — | — | 0.2 | — | — | — | — | — | 0.4 | | 2.6 | | | | |
| | Core Material | — | — | — | 1.2 | 0.6 | — | — | — | — | — | | — | | | | |
| 31 | Brazing Material | 10 | — | — | — | — | — | — | — | — | — | — | — | — | — | — | — |
| | Intermediate Material | 10 | — | — | — | 8 | — | — | — | — | 0.8 | | — | | | | |
| | Core Material | — | — | — | 1.2 | 0.6 | — | — | — | — | — | | — | | | | |
| 32 | Brazing Material | 10 | — | — | — | — | — | — | — | — | — | 0.4 | 9.5 | 5 | Nitrogen | Outside: X Inside: Δ | Outside: Δ Inside: Δ |
| | Intermediate Material | 10 | — | — | — | — | — | — | — | — | 0.8 | | 0.5 | | | | |
| | Core Material | — | — | — | 1.2 | 0.2 | — | — | — | — | — | | — | | | | |
| 33 | Brazing Material | 10 | — | — | — | — | — | — | — | — | — | 0.4 | 8 | 25 | Nitrogen | Outside: Δ Inside: ○ | Outside: Δ Inside: ○ |
| | Intermediate Material | 10 | — | — | — | — | — | — | — | — | 0.8 | | 2 | | | | |
| | Core Material | — | — | — | 1.2 | 1.6 | — | — | — | — | — | | — | | | | |
| 34 | Brazing Material | 12 | — | — | — | — | — | — | — | — | — | 0.4 | — | — | — | — | — |

TABLE 2-continued

| No. | Region | Chemical Composition (mass %) | | | | | | | | | | Thickness (mm) | Clad Ratio (%) | Intermediate Material/brazing Material (%) | Atmosphere | Cup Brazing Test | |
|---|---|---|---|---|---|---|---|---|---|---|---|---|---|---|---|---|---|
| | | Si | Fe | Cu | Mn | Mg | Cr | Zn | Ti | Zr | Bi | | | | | Not Etched | Etched |
| | Intermediate Material | 10 | — | — | — | 3 | — | — | — | — | 0.8 | | — | | | | |
| | Core Material | — | — | — | 1.2 | — | — | — | — | — | — | | — | | | | |
| | Sacrificial anode material | — | — | — | — | — | — | 8 | — | — | — | | | | | | |
| 35 | Brazing Material | 12 | — | — | — | — | — | — | — | — | — | 0.4 | 7.6 | 25 | Nitrogen | Outside: X Inside: Δ | Outside: Δ Inside: ○ |
| | Intermediate Material | 10 | — | — | — | — | — | — | — | — | 0.8 | | 1.9 | | | | |
| | Sacrificial anode material | — | — | — | 0.3 | — | — | 2.5 | — | — | — | | 4.8 | | | | |
| | Core Material | — | — | — | 1.2 | — | — | — | — | — | — | | — | | | | |
| 36 | Brazing Material | 12 | — | — | — | — | — | — | — | — | — | 0.4 | — | — | — | — | — |
| | Intermediate Material | 10 | — | — | — | — | — | — | — | — | 0.8 | | — | | | | |
| | Sacrificial anode material | — | — | — | 6.3 | — | — | 2.5 | — | — | — | | — | | | | |
| | Core Material | — | — | — | 1.2 | — | — | — | — | — | — | | — | | | | |
| 37 | Brazing Material | 10 | — | — | — | — | — | — | — | — | — | 0.4 | — | — | — | — | — |
| | Intermediate Material | 10 | — | 7 | — | 3 | — | — | — | — | 0.4 | | — | | | | |
| | Core Material | — | — | — | 1.2 | — | — | — | — | — | — | | — | | | | |
| 38 | Brazing Material | 10 | — | — | — | — | — | — | — | — | — | 0.4 | — | — | — | — | — |
| | Intermediate Material | 10 | — | — | — | 3 | — | 7 | — | — | 0.4 | | — | | | | |
| | Core Material | — | — | — | 1.2 | — | — | — | — | — | — | | — | | | | |

As listed in Table 2, the test materials 18, 19, and 20 include no intermediate material interposed. The cup test pieces including the test materials 18 to 20 had inferior brazing properties for the outside without etching.

Because the test material 21 includes a brazing material with a low Si content, the test material 21 incurred deficiency in a quantity of the molten brazing material, and had inferior brazing properties for both the inside and the outside. Because the test material 22 includes a brazing material with a high Si content, crack occurred in rolling of the material.

The test material 23 includes an intermediate material with a low Bi content, and incurred poor function to promote destruction of the oxide film on the surface of the brazing material, and had inferior brazing properties. Because the test material 24 includes an intermediate material with a high Bi content, crack occurred in rolling of the material.

Because the test material 25 includes a low Si content in the intermediate material, Mg and Bi remained in the intermediate material. This structure caused deficiency in supply of Mg and Bi to the brazing material, caused poor function to promote destruction of the oxide film on the surface of the brazing material, and had inferior brazing properties. Because the test material 26 includes a brazing material with a high Si content, crack occurred in rolling of the material.

Because the test material 27 includes an intermediate material with a low clad rate, the test material 27 incurred deficiency in supply of Mg and Bi to the brazing material even when Mg and Bi of the upper limit concentrations were added, incurred poor function to promote destruction of the oxide film on the surface of the brazing material, and had inferior brazing properties. Because the test material 28 includes an intermediate material with a high clad rate, Mg included in the intermediate material reached the surface of the brazing material during brazing heating, to make the oxide film firm, and had inferior brazing properties. Because the test material 29 includes an intermediate material with a high clad rate, Bi included in the intermediate material reached the surface of the brazing material earlier than Mg during brazing heating, to form a Bi-based oxide, and impeded the brazing properties.

Because the test material 30 includes an intermediate material with a low Mg content, the test material 30 had poor function to break the oxide film on the surface of the brazing material, and had inferior brazing properties. Because the test material 31 includes an intermediate material with a high Mg content, crack occurred in rolling of the material.

The test material 32 includes a core material with a low Mg content, and incurred poor function to promote destruction of the oxide film on the surface of the brazing material, and had inferior brazing properties. Because the test material 33 includes a core material with a high Mg content, erosion of the molten brazing material progresses due to a decrease in the melting point of the core material, and the test material after brazing was deformed.

Because the test material 34 includes a core material with a low Mg content, crack occurred in rolling of the material. Because the test material 35 includes a sacrificial anode material with a low Mg content, the test material 35 incurred a poor function to promote destruction of the oxide film on the surface of the brazing material, and had inferior brazing properties. Because the test material 36 includes a sacrificial anode material with a high Mg content, crack occurred in rolling of the material.

Because the test material 37 includes an intermediate material with a high Cu content and the test material 38 includes an intermediate material with a high Zn content, crack occurred in rolling of the material.

1 CUP TEST PIECE
2 TEST MATERIAL
3 FIN
4 FLARE GROOVE JOINT
5 FILLET FORMED ON OUTSIDE OF FLARE GROOVE JOINT (expressed as "outside" in cup brazing test listed in Table 1)
6 FILLET FORMED IN JOINT PORTION BETWEEN TEST MATERIAL AND FIN (expressed as "inside" in cup brazing test listed in Table 1)

The invention claimed is:

1. An aluminum alloy brazing sheet used for brazing aluminum including aluminum alloy, without using a flux, in an inert gas atmosphere or vacuum, the brazing sheet being formed by arranging a brazing material on one side or both sides of a core material made of pure aluminum or aluminum alloy, the brazing material including 6% to 13% by mass of Si and the balance being Al and inevitable impurities, and performing cladding with an intermediate material interposed between the core material and the brazing material, the intermediate material including 0.01% to 1.5% by mass of Bi, 1.5% to 13% by mass of Si, and the balance being Al and inevitable impurities, the intermediate material having a thickness of 2% to 35% of a thickness of the brazing material, wherein
one or both of the intermediate material and the core material includes 0.4% to 6% by mass of Mg.

2. The aluminum alloy brazing sheet according to claim 1, wherein the core material made of aluminum alloy includes at least one of 1.8% by mass or less of Mn, 1.2% by mass or less of Si, 1.0% by mass or less of Fe, 1.5% by mass or less of Cu, 0.8% by mass or less of Zn, 0.2% by mass or less of Ti, and 0.5% by mass or less of Zr, and the balance being Al and inevitable impurities.

3. The aluminum alloy brazing sheet according to according to claim 1, wherein the intermediate material further includes one or two of 6% by mass or less of Cu and 6% by mass or less of Zn.

4. The aluminum alloy brazing sheet according to according to claim 2, wherein the intermediate material further includes one or two of 6% by mass or less of Cu and 6% by mass or less of Zn.

5. An aluminum alloy brazing sheet used for brazing aluminum including aluminum alloy, without using a flux, in an inert gas atmosphere or vacuum, the brazing sheet being formed by arranging a brazing material on one side or both sides of a core material made of pure aluminum or aluminum alloy, the brazing material including 6% to 13% by mass of Si and the balance being Al and inevitable impurities, and performing cladding with an intermediate material and a sacrificial anode material interposed between the core material and the brazing material such that the materials are arranged in an order of the core material, the sacrificial anode material, the intermediate material, and the brazing material, the intermediate material including 0.01% to 1.5% by mass of Bi, 1.5% to 13% by mass of Si, and the balance being Al and inevitable impurities, the sacrificial anode material including 0.9% to 6% by mass of Zn and the balance being Al and inevitable impurities, the intermediate material having a thickness of 2% to 35% of a thickness of the brazing material, wherein
at least one of the intermediate material, the sacrificial anode material, and the core material includes 0.4% to 6% by mass of Mg.

6. The aluminum alloy brazing sheet according to claim 5, wherein the core material made of aluminum alloy includes at least one of 1.8% by mass or less of Mn, 1.2% by mass or less of Si, 1.0% by mass or less of Fe, 1.5% by mass or less of Cu, 0.8% by mass or less of Zn, 0.2% by mass or less of Ti, and 0.5% by mass or less of Zr, and the balance being Al and inevitable impurities.

7. The aluminum alloy brazing sheet according to according to claim 5, wherein the intermediate material further includes one or two of 6% by mass or less of Cu and 6% by mass or less of Zn.

8. The aluminum alloy brazing sheet according to according to claim 6, wherein the intermediate material further includes one or two of 6% by mass or less of Cu and 6% by mass or less of Zn.

9. An aluminum alloy brazing sheet used for brazing aluminum including aluminum alloy, without using a flux, in an inert gas atmosphere or vacuum, the brazing sheet being formed by arranging a brazing material on one side of a core material made of pure aluminum or aluminum alloy, the brazing material including 6% to 13% by mass of Si and the balance being Al and inevitable impurities, arranging a sacrificial anode material on the other side of the core material, the sacrificial anode material including 0.9% to 6% by mass of Zn and the balance being Al and inevitable impurities, and performing cladding with an intermediate material interposed between the core material and the brazing material, the intermediate material including 0.01% to 1.5% by mass of Bi, 1.5% to 13% by mass of Si, and the balance being Al and inevitable impurities, the intermediate material having a thickness of 2% to 35% of a thickness of the brazing material, wherein
one or both of the intermediate material and the core material includes 0.4% to 6% by mass of Mg.

10. The aluminum alloy brazing sheet according to claim 9, wherein the core material made of aluminum alloy includes at least one of 1.8% by mass or less of Mn, 1.2% by mass or less of Si, 1.0% by mass or less of Fe, 1.5% by mass or less of Cu, 0.8% by mass or less of Zn, 0.2% by mass or less of Ti, and 0.5% by mass or less of Zr, and the balance being Al and inevitable impurities.

11. The aluminum alloy brazing sheet according to according to claim 9, wherein the intermediate material further includes one or two of 6% by mass or less of Cu and 6% by mass or less of Zn.

12. The aluminum alloy brazing sheet according to according to claim 10, wherein the intermediate material further includes one or two of 6% by mass or less of Cu and 6% by mass or less of Zn.

* * * * *